US012759174B2

(12) United States Patent
Lu

(10) Patent No.: US 12,759,174 B2
(45) Date of Patent: Oct. 13, 2026

(54) FOLDABLE KNIFE

(71) Applicant: Yangjiang Yangdong Jiashuo Metal Products Factory, Yangjiang (CN)

(72) Inventor: Xingsheng Lu, Yangjiang (CN)

(73) Assignee: Yangjiang Yangdong Jiashuo Metal Products Factory, Yangjiang (CN)

( * ) Notice: Subject to any disclaimer, the term of this patent is extended or adjusted under 35 U.S.C. 154(b) by 48 days.

(21) Appl. No.: 19/060,609

(22) Filed: Feb. 21, 2025

(65) Prior Publication Data

US 2026/0249492 A1 Aug. 27, 2026

(51) Int. Cl.

| | |
|---|---|
| ***B26B 1/04*** | (2006.01) |
| ***B26B 1/02*** | (2006.01) |
| ***B26B 1/10*** | (2006.01) |

(52) U.S. Cl.

CPC .................................... *B26B 1/10* (2013.01)

(58) Field of Classification Search

CPC .... B26B 1/04; B26B 1/10; B26B 1/00; B26B 1/045; B26B 1/46

USPC ......... 30/153, 161, 165, 154, 152, 157, 160, 30/340, 342; 7/118

See application file for complete search history.

(56) References Cited

U.S. PATENT DOCUMENTS

| | | | | |
|---|---|---|---|---|
| 1,549,545 | A * | 8/1925 | Hickman | B26B 1/04 30/153 |
| 5,745,997 | A * | 5/1998 | Berg | B25F 1/04 7/128 |
| 7,249,390 | B2 * | 7/2007 | Yale | B25F 1/003 7/128 |
| 2003/0066195 | A1 * | 4/2003 | Moser | B26B 3/06 30/153 |
| 2019/0344457 | A1 * | 11/2019 | Hunt | B26B 1/046 |
| 2020/0189128 | A1 * | 6/2020 | Elling | B26B 1/04 |
| 2021/0154867 | A1 * | 5/2021 | Demko | B26B 1/10 |
| 2022/0134583 | A1 * | 5/2022 | Sung | B26B 1/10 30/165 |

* cited by examiner

*Primary Examiner* — Ghassem Alie

(57) ABSTRACT

A foldable knife includes a left knife handle and a right knife handle provided opposite to each other, a blade, and two rotating rods. The rear end of the left knife handle is rotatably connected to the rear end of the right knife handle, so that respective front ends of the two knife handles can rotate towards and away from each other, opposite sides of the two knife handles are provided with knife grooves, respective ends of the two rotating rods are respectively rotatably connected to the rear end of the blade, and the other ends of the two rotating rods are respectively rotatably connected in the knife grooves of the knife handles on the corresponding sides, the two knife handles will be rotated to push the two rotating rods to rotate and drive the blade to be in an open state and to be in a closed state.

13 Claims, 5 Drawing Sheets

FOLDABLE KNIFE

TECHNICAL FIELD

The present application falls within the technical field of manual cutting tools, and specifically relates to a foldable knife.

BACKGROUND ART

Existing foldable knife structures generally include a knife handle provided with a knife groove, and a blade hinged to an end of the knife groove, where the blade can rotate to an open state of being out of the knife groove and a closed state of being received in the knife groove. In use, the blade may be rotated to open to cut an article. When not in use, the blade can be rotatably received in the knife groove to protect a cutting edge of the blade from being cut by the cutting edge, which is safe to use, and also can reduce a volume of the foldable knife, which is convenient to carry and store.

However, the existing foldable knife also has disadvantages, i.e., the existing foldable knife structure rotates basically by pulling a blade to achieve opening of the blade and the rotation of the pressing blade to achieve the closing of the blade during operation, so that it is relatively difficult for the user to open and close the blade and the operation is not convenient; and the structure of the existing foldable knife is conventional, and thus the design concept of the conventional foldable knife cannot be broken.

SUMMARY OF THE INVENTION

In view of the above drawbacks of the prior art, it is an object of the present application to provide a foldable knife which is novel in structure and convenient in opening and closing operations.

In order to achieve the above-mentioned object, the technical solution adopted by the present application is: a foldable knife including a left knife handle and a right knife handle provided opposite to each other, a blade, and two rotating rods, where a rear end of the left knife handle is rotatably connected to the rear end of the right knife handle, so that respective front ends of the two knife handles can rotate towards and away from each other, opposite sides of the two knife handles are provided with knife grooves, respective ends of the two rotating rods are respectively rotatably connected to the rear end of the blade, and the other ends of the two rotating rods are respectively rotatably connected in the knife grooves of the knife handles on the corresponding sides, the two knife handles will be rotated to push the two rotating rods to rotate and drive the blade to extend out of the front ends of the two knife handles to be in an open state and received between the two knife grooves to be in a closed state.

In the above-mentioned solution, rotating rods are rotatably connected in the knife grooves of the left knife handle and the right knife handle respectively, and the other ends of the two rotating rods are rotatably connected to the rear end of the blade; during use, the two knife handles can be rotated in a direction away from each other; in this process, the two knife handles will drive the two rotating rods to rotate, and the blade will also extend forward; when the two rotating rods are rotated until they are in a linear state, since the process of the blade extending forward has a certain inertia, the two rotating rods will continue to be driven to rotate toward the same direction and become to be in a broken line state, and then the two knife handles are rotated in a direction closer to each other will drive the two rotating rods to push the blade to an open state, in this state, the user can grasp the two handles to control the cutting edge of the blade to cut the article. However, when not in use, the two knife handles can be further rotated in a direction away from each other; in this process, the two knife handles will drive the two rotating rods to rotate in a reverse direction, and at the same time, the blade will be retracted backwards; when the two rotating rods rotate in a reverse direction, the two rotating rods are in a straight line state; since the process of retracting the blade backwards also has a certain inertia, the two rotating rods will continue to be driven to rotate towards the same direction and become a broken line state, and then rotating the two knife handles in a direction closer to each other will drive the two rotating rods to push the blade to a closed state, in this state, the cutting edge of the blade can be protected, safe in use, and convenient to carry and store. In addition, when the foldable knife of the present application is operated to open and close the blade, the two rotating rods are driven to rotate by rotating the two knife handles, and the two rotating rods are driven to extend to open and retract to close the blade, which is completely different from the opening and closing operation mode of a traditional foldable knife, has a novel structure, and the operation of opening and closing the blade by rotating the two knife handles would be safer and more convenient to operate.

Further, the foldable knife includes a reset part for pushing the left knife handle and the right knife handle toward each other. The reset part can keep the front ends of the two knife handles close to each other without external force, prevent the front ends of the two knife handles from automatically rotating away, improve the structural stability of the foldable knife in the open and closed states, and make it more convenient and safer to use.

In order to achieve the above-mentioned structural function of being able to automatically push the two knife handles to rotate towards each other, the rear end of the above-mentioned right knife handle is rotatably connected to the rear end of the left knife handle via a rotating shaft, and the reset part is a torsion spring sleeved on the outside of the rotating shaft, two legs of the torsion spring respectively bear against the left knife handle and the right knife handle, and in the absence of an external force, the torsion spring automatically pushes the left knife handle and the right knife handle to rotate towards each other via its own elastic force, so as to achieve simple resetting.

Further, the above-mentioned two rotating rods are provided with a plurality of teeth in the circumferential direction corresponding to the edge side of one end connected to the blade, and the teeth of the two rotating rods are engaged with each other, so that synchronous rotation of the two rotating rods can be ensured, so that the blade can move smoothly during the process of opening and closing, and the blade can remain relatively fixed with the knife handle in the open state of the blade, improving the structural stability of the folding blade.

Further, the above-mentioned left knife handle includes a left upper handle piece and a left lower handle piece which are provided opposite to each other, and the right knife handle includes an upper right handle piece and a lower right handle piece which are provided opposite to each other, where a gap is provided between the upper handle piece and the lower handle piece to form a knife groove, so that the assembly of the two knife handles can be facilitated. The above-mentioned rotating shaft is provided at the position of the rear end between the left upper handle piece and the left lower handle piece, a connecting block is provided on an inner side of the rear end of the right upper handle piece and the right lower handle piece, the connecting block is provided with a through hole, the through hole of the connecting block is sleeved on the outside of the rotating shaft, and the right knife handle is connected to the rotating shaft of the left knife handle via the connecting block, which not only improves the rotational stability of the two handles, but also enables the outside surfaces of the right upper handle piece and the right lower handle piece to be flush with the outside surfaces of the left upper handle piece and the left lower handle, so that the structure of the foldable knife is more compact.

Further, the above-mentioned positions of the front end between the left upper handle piece and the left lower handle piece and the front end between the right upper handle piece and the right lower handle piece are all provided with a positioning column, and the position corresponding to the positioning column of the blade is provided with a positioning groove, and when the blade is in an open state, the positioning column cooperates with the positioning groove, so that the structural stability of the blade in the open state can be improved, and the cutting operation is more reliable.

Further, the above-mentioned rotating rod includes an upper rod and a lower rod which are provided opposite to each other, the blade is located between the upper rod and the lower rod, the front ends of the upper rod and the lower rod are both rotatably connected to the rear end of the blade, the edge sides of the front ends of the upper rod and the lower rod are both provided with a plurality of teeth in the circumferential direction, and the teeth of the two upper rods are engaged with each other, the teeth of the two lower rods are engaged with each other, and a rear end of the upper rod is rotatably connected to an inner side of an upper blade of a corresponding side knife handle, and a rear end of the lower rod is rotatably connected to an inner side of the lower handle piece of the corresponding side handle. This improves the stability of the assembly of the rotating rod with the blade and further improves the stability of the transmission of the rotating rod to the blade, and the blade is positioned between the upper rod and the lower rod, so that the position of the blade is reserved between the upper rod and the lower rod, so that the rotating rod does not obstruct the closing of the blade.

Further, the front ends of the above-mentioned upper rod and lower rod are rotatably connected to the blade via pins, and avoidance grooves are provided at a position corresponding to the pin of each handle piece, and when the blade is in a closed state, the respective pins are placed in the corresponding avoidance grooves, so as to avoid interference of the knife handle on the pin and affect the compactness of the foldable knife in the closed state.

Further, a spacer is fitted around the outside of the pin corresponding to a position between the blade and the upper rod and a position between the blade and the lower rod, respectively, so that the blade rotates more smoothly with respect to the rotating rod.

Further, the above-mentioned left knife handle and the right knife handle are provided with an anti-slip groove on the outsides thereof so as to avoid a slip of the hand when grasping both knife handles.

The foldable knife in the present application drives the two rotating rods to rotate by rotating the two knife handles, and the two rotating rods drive the blade to open and close, which is completely different from the opening and closing operation mode of a traditional foldable knife, and has a novel structure. In addition, in the operation, only one knife handle needs to be grasped, and then the foldable knife is shaken, so that the other knife handle is moved away and then automatically approaches, so that the blade can be operated to switch between the open and closed states, so that the blade can be rapidly switched between the open and closed states, the opening and closing operation of the blade is convenient, and since it is not necessary to contact the blade to open and close the blade, the safety is high.

DETAILED DESCRIPTION OF THE INVENTION

Figure 1:
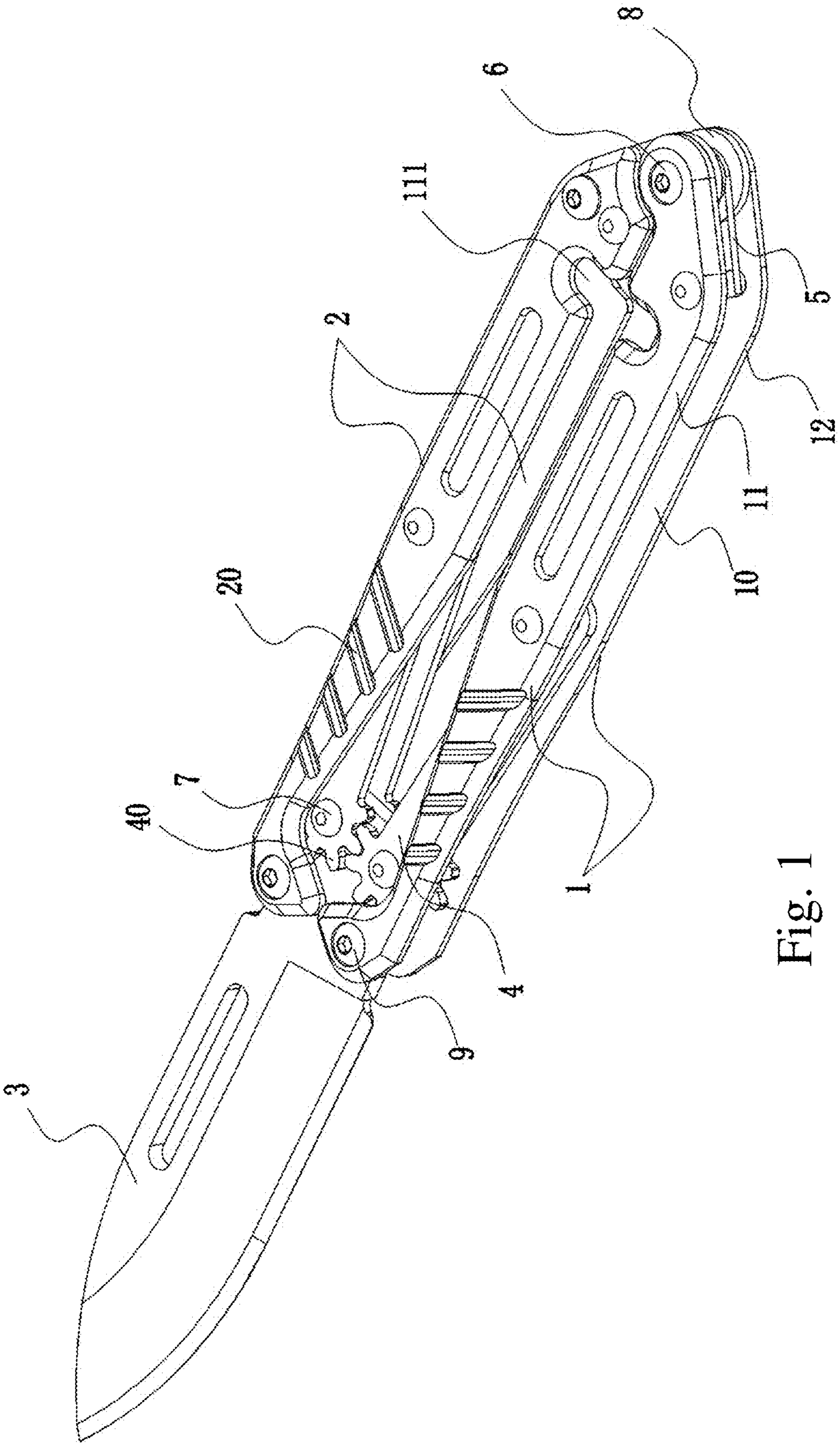
FIG. 1 is a schematic structural diagram showing a foldable knife in an open state of a blade according to an embodiment of the present application.

The drawings are only for purposes of illustration and are not to be construed as limiting the patent; in order to better explain the present embodiment, some components in the FIGS. are omitted, enlarged or reduced, and do not represent the size of the actual product; it will be appreciated by a person skilled in the art that certain well-known structures and descriptions thereof may be omitted from the figures. The positional relationships depicted in the FIGS. are for illustrative purposes only and are not to be construed as limiting this patent.

The same or similar reference numerals in the figures of the embodiments of the present application correspond to the same or similar components; in the description of the present application, it is to be understood that the terms “upper”, “lower”, “left”, “right”, “long”, “short”, and the like, if any, indicate orientations or positional relationships based on the orientation or positional relationships shown in the drawings, are merely used for convenience in describing the present application and to simplify the description, and do not indicate or imply that the referenced devices or elements must have a particular orientation, constructed and operated in a particular orientation. Therefore, the terms describing the positional relationships in the drawings are used for illustrative purposes only and are not to be construed as limitations on the present patent, as a person skilled in the art will readily appreciate, and the specific meaning of the above terms can be understood according to specific circumstances.

The technical solution of the present application is further specifically described below by way of specific embodiments in conjunction with the accompanying drawings:

Embodiment 1

As shown in FIG. 1, the present embodiment provides a foldable knife including a left knife handle 1 and a right knife handle 2 provided opposite to each other, a blade 3, and two rotating rods 4, where a rear end of the left knife handle 1 is rotatably connected to a rear end of the right knife handle 2, so that respective front ends of the two handles can rotate towards and away from each other, opposite sides of the two handles are provided with knife grooves 10, respective front ends of the two rotating rods 4 are respectively rotatably connected to the rear ends of the blade 3, and the rear ends of the two rotating rods 4 are respectively rotatably connected to the inner middle positions of the knife grooves 10 of the corresponding side handles. Rotating the two knife handles will push the two rotating rods 4 to rotate and drive the blade 3 to extend out the front ends of the two knife handles to be in an open state of and received between the two knife grooves 10 to be in a closed state.

Figure 2:
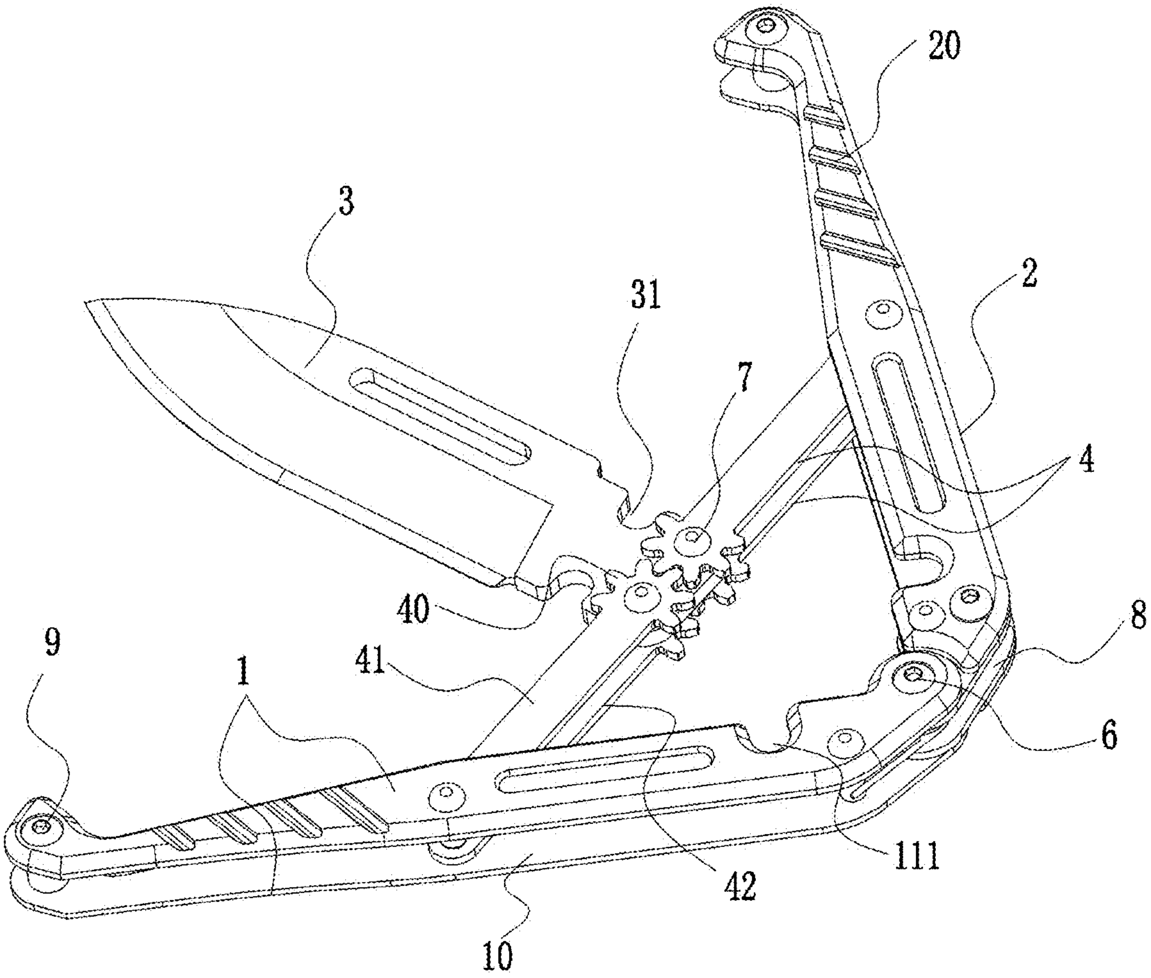
FIG. 2 is a schematic structural diagram showing a foldable knife in a semi-open state of a blade according to an embodiment of the present application.
Figure 3:
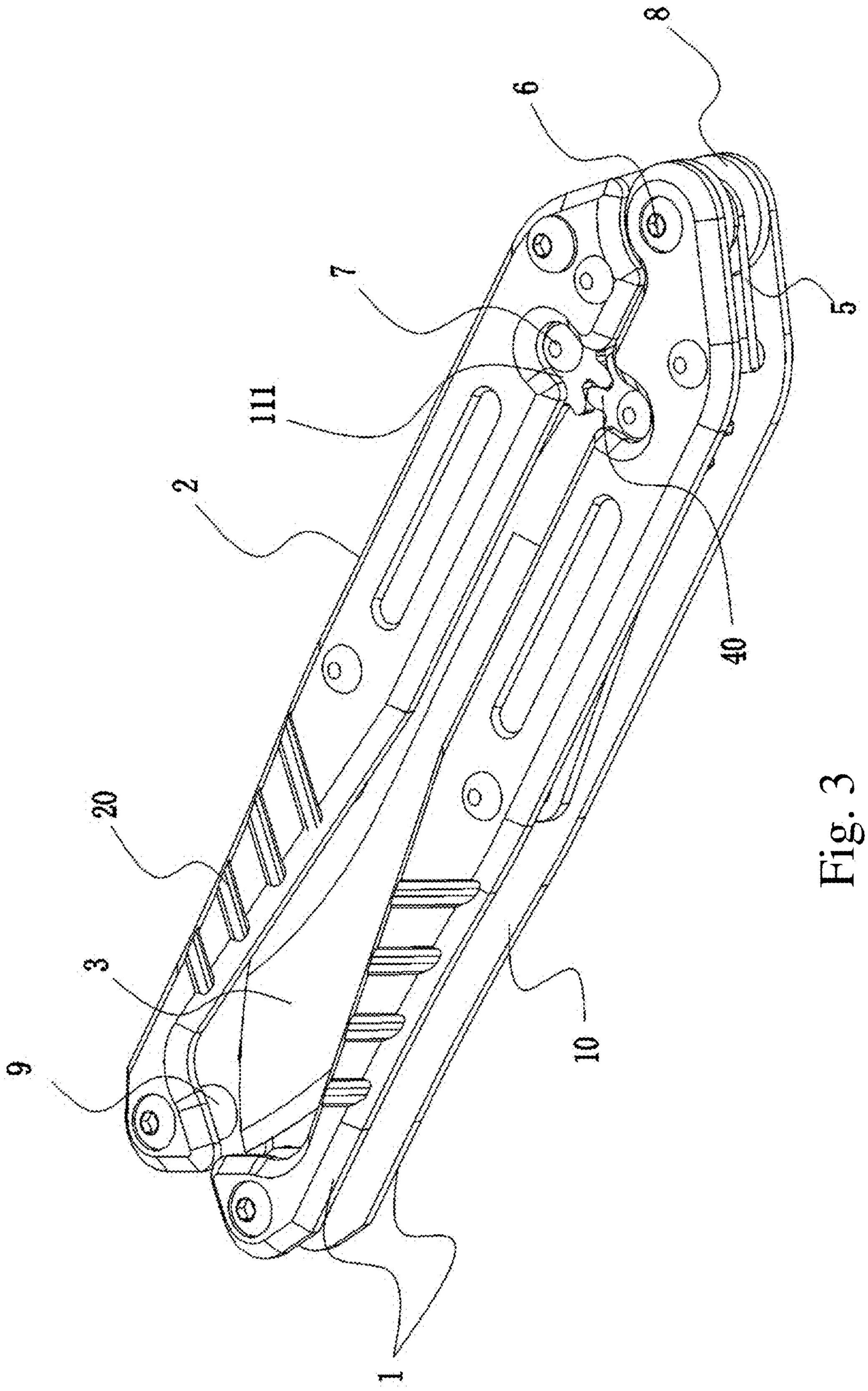
FIG. 3 is a schematic structural diagram showing a foldable knife in a closed state of a blade according to an embodiment of the present application.

When the foldable knife of the present embodiment is used, as shown in FIGS. 1 and 2, the two knife handles can be rotated in a direction away from each other, in this process, the two knife handles will drive the two rotating rods 4 to rotate, and the blade 3 will also extend forward; when the two rotating rods 4 are rotated until they are in a linear state, since the process of the blade 3 extending forward has a certain inertia, the two rotating rods 4 will continue to be driven to rotate toward the same direction and become to be in a broken line state, and then the two knife handles 4 are rotated in a direction closer to each other will drive the two rotating rods 4 to push the blade 3 to an open state, in this state, the user can grasp the two handles to control the cutting edge of the blade 3 to cut the article. However, when not in use, as shown in FIGS. 2 and 3, the two knife handles can be further rotated in a direction away from each other; in this process, the two knife handles will drive the two rotating rods 4 to rotate in a reverse direction, and at the same time, the blade 3 will be retracted backwards; when the two rotating rods 4 rotate in a reverse direction, the two rotating rods 4 are in a straight line state; since the process of retracting the blade 3 backwards also has a certain inertia, the two rotating rods 4 will continue to be driven to rotate towards the same direction and become a broken line state, and then rotating the two knife handles in a direction closer to each other will drive the two rotating rods 4 to push the blade 3 to a closed state, in this state, the cutting edge of the blade 3 can be protected, safe in use, and convenient to carry and store.

When the foldable knife of the present embodiment is operated to open and close the blade 3, the two rotating rods 4 are driven to rotate by rotating the two knife handles, and the two rotating rods 4 are driven to extend to open and retract to close the blade 3, which is completely different from the opening and closing operation mode of a traditional foldable knife, has a novel structure, and the operation of opening and closing the blade 3 by rotating the two knife handles would be safer and more convenient to operate.

Embodiment 2

Figure 4:
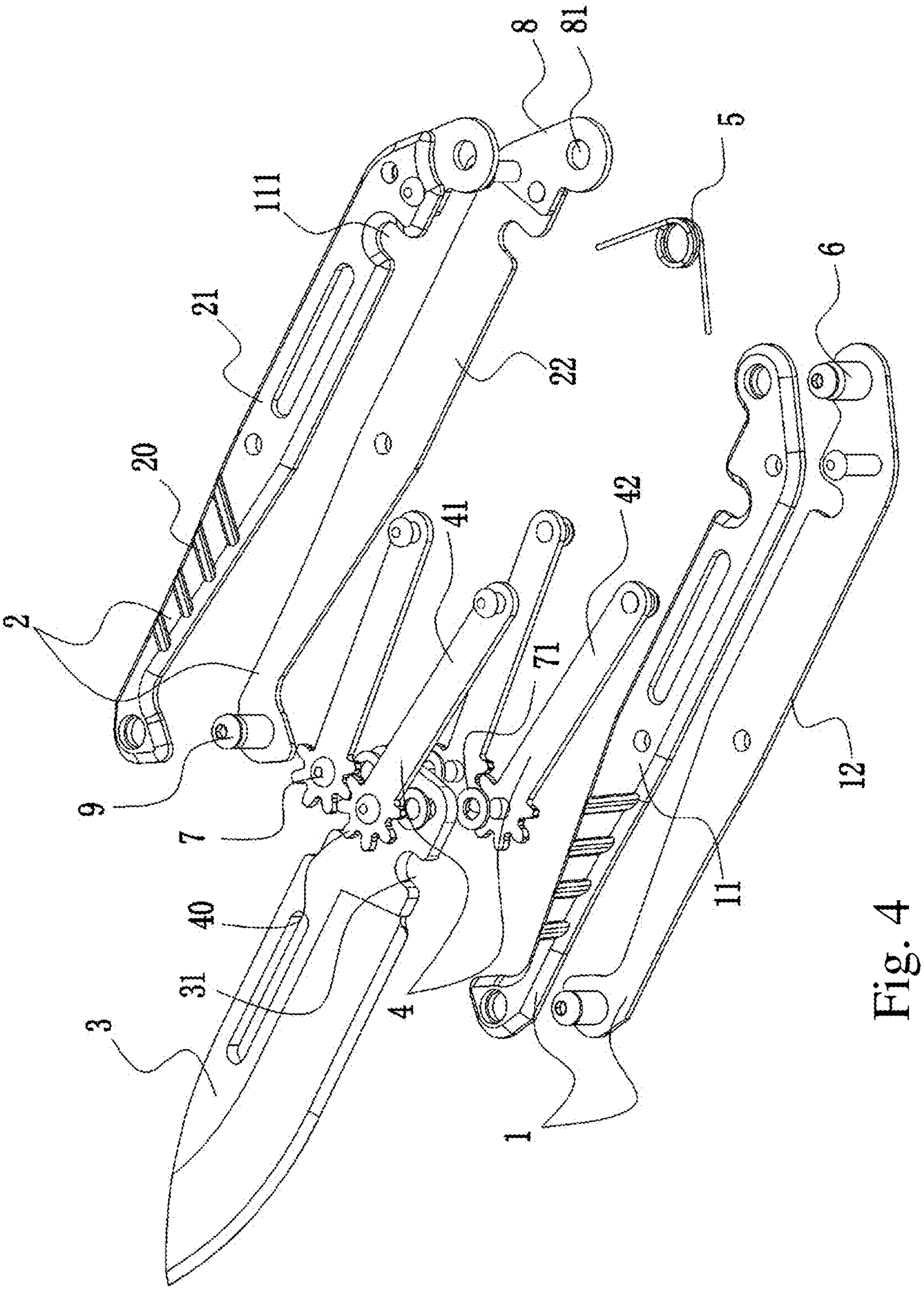
FIG. 4 is an exploded structural view of a foldable knife according to an embodiment of the present application.

The present embodiment is a further improvement of the structure of the foldable knife according to Embodiment 1 in that, as shown in FIGS. 1 and 4, the foldable knife includes a reset part 5 for pushing the left knife handle 1 and the right knife handle 2 toward each other. The reset part 5 can keep the front ends of the two knife handles close to each other without external force, prevent the front ends of the two knife handles from automatically rotating away, improve the structural stability of the foldable knife in the open and closed states, and make it more convenient and safer to use.

In order to achieve the above-mentioned structural function of being able to automatically push the two knife handles to rotate towards each other, the rear end of the above-mentioned right knife handle 2 is rotatably connected to a rear end of the left knife handle 1 via a rotating shaft 6, and the reset part 5 is a torsion spring sleeved on the outside of the rotating shaft 6, two legs of the torsion spring respectively abut against the inner sides of the left knife handle 1 and the right knife handle 2, and in the absence of an external force, the torsion spring automatically pushes the left knife handle 1 and the right knife handle 2 to rotate towards each other via its own elastic force, so as to achieve simple resetting.

In addition, the above-mentioned two rotating rods 4 are provided with a plurality of teeth 41 in the circumferential direction corresponding to the edge side of one end connected to the blade 3, and the teeth 41 of the two rotating rods 4 are engaged with each other, so that synchronous rotation of the two rotating rods 4 can be ensured, so that the blade 3 can move smoothly during the process of opening and closing, and the blade can remain relatively fixed with the knife handle in the open state of the blade 3, improving the structural stability of the folding blade.

The foldable knife in the present embodiment achieves the function of automatically resetting two knife handles by adding a torsion spring structure, and can achieve a quick opening and closing operation of the foldable knife, for example, during operation, as shown in FIG. 1, at this time, the blade 3 is in an open state, and a right knife handle 2 can be grasped by hand (in the present embodiment, grasping the right knife handle 2 by hand is used as an illustration, and in actual operation, any knife handle can be grasped for operation), and then the foldable knife is shaken so that the left knife handle 1 rotates in a direction away from the right knife handle 2; while the left knife handle 1 rotates in a direction away from the right knife handle 2, the two rotating rods 4 are driven to rotate backwards, and the blade 3 is driven to retract backwards. As shown in FIG. 2, when the two rotating rods 4 rotate backward until the two rotating rods 4 are in a straight line state, since the process of retracting the blade 3 backward has a certain inertia, the two rotating rods 4 will continue to be driven to rotate backward to change into a fold line state, and then the torsion spring will push the two knife handles to rotate in an approaching direction, as shown in FIG. 3, so that the two rotating rods 4 will continue to rotate backward to drive the blade 3 to close, thereby achieving a quick closing operation of the folding blade. By the same reasoning, when the blade 3 is in a closed state, the right knife handle 2 can be grasped by hand, and the left knife handle 1 is driven to rotate away from the right knife handle 2 by shaking the foldable knife again, and then the left knife handle 1 is automatically reset by the torsion spring, the blade 3 can be quickly opened, and a quick opening operation of the foldable knife can be achieved.

It is equivalent to merely grasping one of the knife handles, then shaking the foldable knife, so that the other knife handle is far away, and then resetting to by a torsion spring to make the two knife handles close to each other, so that the blade 3 can be operated to change states, and the blade 3 can be quickly changed between an open state and a closed state, and the operation is fast and convenient.

Embodiment 3

The present embodiment is a further improvement in the structure of the foldable knife according to Embodiment 2. As shown in FIG. 4, the above-mentioned left knife handle 1 includes a left upper handle piece 11 and a left lower handle piece 12 which are provided opposite to each other, and the right knife handle 2 includes a right upper handle piece 21 and a right lower handle piece 22 which are provided opposite to each other, where a gap is provided between the upper handle piece and the lower handle piece to form a knife groove 10, so that the assembly of the two knife handles can be facilitated. The above-mentioned rotating shaft 6 is provided at the position of the rear end between the left upper handle 11 and the left lower handle 12, a connecting block 8 is provided on an inner side of the rear end of the right upper handle piece 21 and the right lower handle piece 22, the connecting block 8 is provided with a through hole 81, the through hole 81 of the connecting block 8 is sleeved on the outside of the rotating shaft 6, and the two connecting blocks 8 are located at the position between the left upper handle 11 and the left lower handle 12. The right knife handle 2 of this solution is connected to the rotating shaft 6 of the left knife handle 1 via the connecting block 8, which not only improves the rotational stability of the two handles, but also enables the outside surfaces of the right upper handle piece 21 and the right lower handle piece 22 to be flush with the outside surfaces of the left upper handle piece 11 and the left lower handle 12, so that the structure of the foldable knife is more compact.

As shown in FIG. 4, positioning columns 9 are provided at a front end between the left upper handle piece 11 and the left lower handle piece 12 and a front end between the right upper handle piece 21 and the right lower handle piece 22, and the positioning columns 9 can improve the structural stability of the upper handle piece and the lower handle piece 12. A position where the above-mentioned blade 3 corresponds to the positioning column 9 is provided with a positioning groove 31, and as shown in FIG. 1, when the blade 3 is in an open state, the positioning column 9 cooperates with the positioning groove 31, so that the structural stability of the blade 3 in the open state can be improved, and the cutting operation is more reliable.

Figure 5:
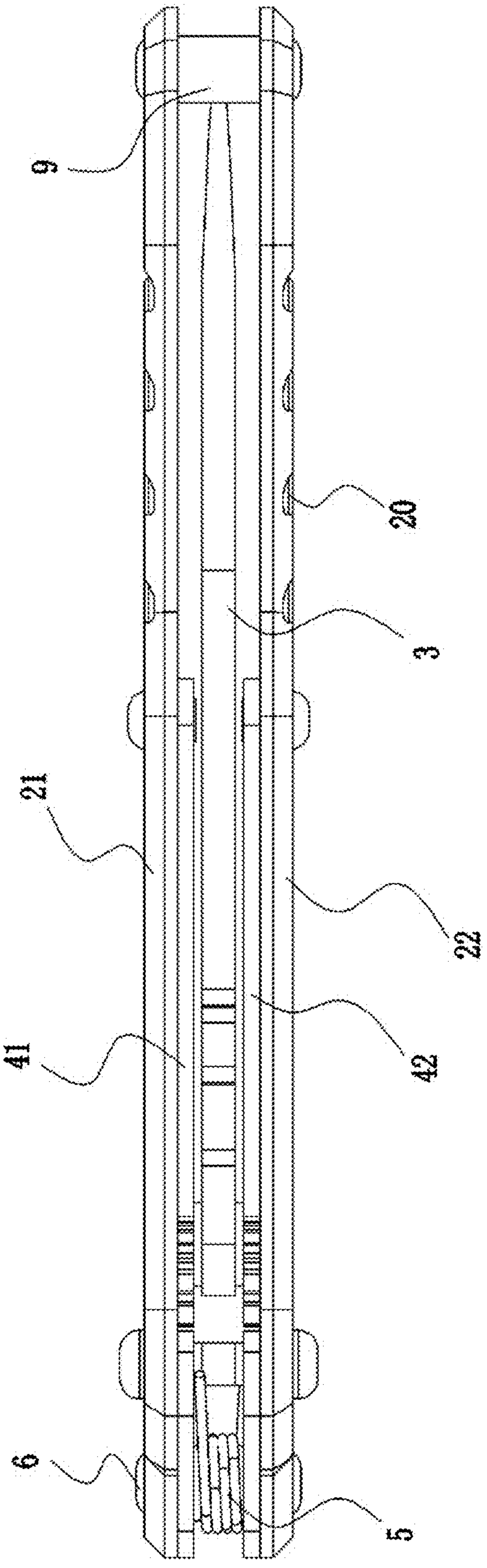
FIG. 5 is a schematic side view of a foldable knife in a closed state of a blade according to an embodiment of the present application.

As shown in FIGS. 4 and 5, the above-mentioned rotating rod 4 includes an upper rod 41 and a lower rod 42 which are provided opposite to each other, the blade 3 is located between the upper rod 41 and the lower rod 42, the front ends of the upper rod 41 and the lower rod 42 are both coaxially and rotatably connected to the rear end of the blade 3, the edge sides of the front ends of the upper rod 41 and the lower rod 42 are both provided with a plurality of teeth 40 in the circumferential direction, and the teeth 40 of the two upper rods 41 are engaged with each other, and the rear end of the upper rod 41 is rotatably connected to the lower middle part of the upper handle piece of the corresponding side knife handle, the rear end of the lower rod 42 is rotatably connected to the upper middle part of the lower handle piece of the corresponding side handle; in the present embodiment, the rear end of the upper rod 41 and the rear end of the lower rod 42 are coaxially connected to the handle, so that the assembly stability of the rotating rod 4 and the blade 3 can be improved, and the transmission stability of the rotating rod 4 to the blade 3 can also be further improved; and the blade 3 is located between the upper rod 41 and the lower rod 42, so that the position of the blade 3 is reserved between the upper rod 41 and the lower rod 42, so that the rotating rod 4 does not obstruct the closing of the blade 3.

As shown in FIGS. 3 and 4, the front ends of the above-mentioned upper rod 41 and lower rod 42 are rotatably connected to the blade 3 via pins 7, and an avoidance groove 111 is provided at a position where respective handle pieces correspond to the pins 7, and when the blade 3 is in a closed state, the respective pins 7 are placed in the corresponding avoidance grooves 111, so as to avoid the interference of the knife handle on the pin 7 and affect the compactness of the foldable knife in the closed state. Spacers 71 are respectively sleeved on the outside of the above-mentioned pins 7 corresponding to a position between the blade 3 and the upper rod 41 and a position between the blade 3 and the lower rod 42, so that the blade 3 rotates more smoothly with respect to the rotating rod 4. In addition, the left knife handle 1 and the right knife handle 2 are provided with an anti-slip groove 20 on the outsides thereof so as to avoid a slip of the hand when grasping both knife handles.

Apparently, the above-described embodiments of the present application are merely illustrative of the present application and are not restrictive of the embodiments of the present application. For a person skilled in the art, various other modifications and variations can be made in the light of the above description. All embodiments need not be, and cannot be, exhaustive. It is intended that the following appended claims be interpreted as including all such alterations, permutations, and improvements as fall within the true spirit and protection scope of the present application.

The invention claimed is:

1. A foldable knife, comprising a left knife handle (1) and a right knife handle (2) provided opposite to each other, a blade (3), and two rotating rods (4), wherein a rear end of the left knife handle (1) is rotatably connected to a rear end of the right knife handle (2), so that respective front ends of the two knife handles can rotate towards and away from each other, opposite sides of the two knife handles are provided with knife grooves (10), respective ends of the two rotating rods (4) are respectively rotatably connected to the rear end of the blade (3), and the other ends of the two rotating rods (4) are respectively rotatably connected in the knife grooves (10) of the knife handles on the corresponding sides, the two knife handles will be rotated to push the two rotating rods to rotate and drive the blade (3) to extend out of the front ends of the two knife handles to be in an open state and received between two knife grooves to be in a closed state;

wherein the foldable knife further comprises a reset part (5) for automatically pushing the left knife handle (1) and the right knife handle (2) to rotate towards each other; and wherein the rear end of the right knife handle (2) is rotatably connected to the rear end of the left knife handle (1) via a rotating shaft (6), the reset part (5) is a torsion spring sleeved on the outside of the rotating shaft (6), and two legs of the torsion spring respectively abut against the left knife handle (1) and the right knife handle (2).

2. The foldable knife according to claim 1, wherein two of the rotating rods (4) are provided with a plurality of teeth (40) in a circumferential direction corresponding to an edge side of the end connected with the blade (3), and the teeth (40) of the two rotating rods (4) are engaged with each other.

3. The foldable knife according to claim 2, wherein the left knife handle (1) comprises a left upper handle piece (11) and a left lower handle piece (12) which are provided opposite to each other, the right knife handle (2) comprises a right upper handle piece (21) and a right lower handle piece (22) which are provided opposite to each other, a gap is provided between the upper handle piece and the lower handle piece to form a knife groove (10), a rotating shaft (6) is provided at a position of the rear end between the left upper handle piece (11) and the left lower handle piece (12), a connecting block (8) is provided inside the rear end of the right upper handle piece (21) and the right lower handle piece (22), the connecting block (8) is provided with a through hole (81), and the through hole (81) of the connecting block (8) is sleeved on the outside of the rotating shaft (6).

4. The foldable knife according to claim 3, wherein the blade (3) comprises a positioning column (9) is-provided at a front end between the left upper handle piece (11) and the left lower handle piece (12) and at a front end between the right upper handle piece (21) and the right lower handle piece (22), a positioning groove (31) is provided at a position corresponding to the positioning column (9) of the blade (3), and when the blade (3) is in the open state, the positioning column (9) cooperates with the positioning groove (31).

5. The foldable knife according to claim 3, wherein the rotating rod (4) comprises an upper rod (41) and a lower rod (42) which are provided opposite to each other, the blade (3) is located between the upper rod (41) and the lower rod (42), the front ends of the upper rod (41) and the lower rod (42) are both rotatably connected to the rear end of the blade (3), the edge sides of the front ends of the upper rod (41) and the lower rod (42) are both provided with a plurality of teeth (40) in the circumferential direction, and the teeth (40) of the two upper rods (41) are engaged with each other, the teeth (40) of the two lower rods (42) are engaged with each other, and a rear end of the upper rod (41) is rotatably connected to an inner side of an upper handle piece of a corresponding side knife handle, and a rear end of the lower rod (42) is rotatably connected to an inner side of the lower handle piece of the corresponding side handle.

6. The foldable knife according to claim 5, wherein the front ends of the upper rod (41) and the lower rod (42) are rotatably connected to the blade (3) via pins (7), and avoidance grooves (111) are provided on respective upper and lower handle pieces corresponding to the positions of the pins (7), and when the blade (3) is in a closed state, the respective pins (7) are placed in the corresponding avoidance grooves (111).

7. The foldable knife according to claim 6, wherein spacers (71) are respectively sleeved on the outside of the pins (7) corresponding to a position between the blade (3) and the upper rod (41) and a position between the blade (3) and the lower rod (42).

8. The foldable knife according to claim 1, wherein the left knife handle (1) comprises a left upper handle piece (11) and a left lower handle piece (12) which are provided opposite to each other, the right knife handle (2) comprises a right upper handle piece (21) and a right lower handle piece (22) which are provided opposite to each other, a gap is provided between the upper handle piece and the lower handle piece to form a knife groove (10), the rotating shaft (6) is provided at a position of the rear end between the left upper handle piece (11) and the left lower handle piece (12), a connecting block (8) is provided inside the rear end of the right upper handle piece (21) and the right lower handle piece (22), the connecting block (8) is provided with a through hole (81), and the through hole (81) of the connecting block (8) is sleeved on the outside of the rotating shaft (6).

9. The foldable knife according to claim 8, wherein the blade (3) comprises a positioning column (9) provided at a front end between the left upper handle piece (11) and the left lower handle piece (12) and at a front end between the right upper handle piece (21) and the right lower handle piece (22), a positioning groove (31) is provided at a position corresponding to the positioning column (9) of the blade (3), and when the blade (3) is in the open state, the positioning column (9) cooperates with the positioning groove (31).

10. The foldable knife according to claim 8, wherein the rotating rod (4) comprises an upper rod (41) and a lower rod (42) which are provided opposite to each other, the blade (3) is located between the upper rod (41) and the lower rod (42), the front ends of the upper rod (41) and the lower rod (42) are both rotatably connected to the rear end of the blade (3), the edge sides of the front ends of the upper rod (41) and the lower rod (42) are both provided with a plurality of teeth (40) in the circumferential direction, and the teeth (40) of the two upper rods (41) are engaged with each other, the teeth (40) of the two lower rods (42) are engaged with each other, and a rear end of the upper rod (41) is rotatably connected to an inner side of an upper handle piece of a corresponding side knife handle, and a rear end of the lower rod (42) is rotatably connected to an inner side of the lower handle piece of the corresponding side handle.

11. The foldable knife according to claim 10, wherein the front ends of the upper rod (41) and the lower rod (42) are rotatably connected to the blade (3) via pins (7), and avoidance grooves (111) are provided on respective upper and lower handle pieces corresponding to the positions of the pins (7), and when the blade (3) is in a closed state, the respective pins (7) are placed in the corresponding avoidance grooves (111).

12. The foldable knife according to claim 11, wherein spacers (71) are respectively sleeved on the outside of the pins (7) corresponding to a position between the blade (3) and the upper rod (41) and a position between the blade (3) and the lower rod (42).

13. The foldable knife according to claim 1, wherein an anti-slip groove (20) is provided outside the left knife handle (1) and the right knife handle (2).

* * * * *